United States Patent
Earl et al.

(10) Patent No.: US 9,887,924 B2
(45) Date of Patent: Feb. 6, 2018

(54) DISTRIBUTED POLICY-BASED PROVISIONING AND ENFORCEMENT FOR QUALITY OF SERVICE

(71) Applicant: VMware, Inc., Palo Alto, CA (US)

(72) Inventors: William Earl, Palo Alto, CA (US); Christos Karamanolis, Los Gatos, CA (US)

(73) Assignee: VMware, Inc., Palo Alto, CA (US)

( * ) Notice: Subject to any disclaimer, the term of this patent is extended or adjusted under 35 U.S.C. 154(b) by 85 days.

(21) Appl. No.: 14/010,247

(22) Filed: Aug. 26, 2013

(65) Prior Publication Data
US 2015/0058475 A1    Feb. 26, 2015

(51) Int. Cl.
G06F 15/173 (2006.01)
H04L 12/851 (2013.01)
H04L 12/911 (2013.01)
G06F 9/455 (2006.01)
G06F 3/06 (2006.01)

(52) U.S. Cl.
CPC .............. *H04L 47/24* (2013.01); *G06F 3/067* (2013.01); *G06F 9/45558* (2013.01); *H04L 47/2483* (2013.01); *H04L 47/741* (2013.01); *G06F 2009/45579* (2013.01); *G06F 2209/508* (2013.01); *H04L 47/822* (2013.01)

(58) Field of Classification Search
CPC ........... G06F 2009/45579; H04L 43/16; H04L 20/38; H04L 47/822
See application file for complete search history.

(56) References Cited

U.S. PATENT DOCUMENTS

| | | | |
|---|---|---|---|
| 6,314,526 B1 | 11/2001 | Arendt et al. | |
| 6,553,389 B1 | 4/2003 | Golding et al. | |
| 6,658,473 B1 | 12/2003 | Block et al. | |
| 6,839,752 B1 | 1/2005 | Miller et al. | |
| 7,360,030 B1 * | 4/2008 | Georgiev ..................... | 711/141 |

(Continued)

FOREIGN PATENT DOCUMENTS

JP    10049423 A    2/1998
JP    2002108567 A    4/2002
(Continued)

OTHER PUBLICATIONS

International Search Report and Written Opinion dated Oct. 17, 2014, International Application No. PCT/US2014/041761, 10 pages.

(Continued)

*Primary Examiner* — Umar Cheema
*Assistant Examiner* — Tesfu Mekonen
(74) *Attorney, Agent, or Firm* — Patterson & Sheridan, LLP

(57) ABSTRACT

Embodiments of the disclosure provide techniques for measuring congestion and controlling quality of service to a shared resource. A module that interfaces with the shared resource monitors the usage of the shared resource by accessing clients. Upon detecting that the rate of usage of the shared resource has exceeded a maximum rate supported by the shared resource, the module determines and transmits a congestion metric to clients that are currently attempting to access the shared resource. Clients, in turn determine a delay period based on the congestion metric prior to attempting another access of the shared resource.

17 Claims, 7 Drawing Sheets

(56) References Cited

U.S. PATENT DOCUMENTS

| | | | |
|---|---|---|---|
| 7,669,029 | B1 | 2/2010 | Mishra et al. |
| 7,716,425 | B1 | 5/2010 | Uysal et al. |
| 8,074,003 | B1 | 12/2011 | Salamon et al. |
| 8,103,769 | B1 * | 1/2012 | Weiser et al. ............... 709/225 |
| 8,127,059 | B1 | 2/2012 | Carr et al. |
| 8,453,036 | B1 | 5/2013 | Goel et al. |
| 8,566,520 | B1 | 10/2013 | Bitner et al. |
| 8,635,422 | B1 | 1/2014 | Kaliannan et al. |
| 8,645,654 | B1 | 2/2014 | Bailey et al. |
| 8,682,916 | B2 | 3/2014 | Wong et al. |
| 8,843,925 | B1 * | 9/2014 | Beda et al. .................... 718/1 |
| 8,954,979 | B1 | 2/2015 | Myers |
| 8,984,243 | B1 | 3/2015 | Chen et al. |
| 9,015,123 | B1 | 4/2015 | Mathew et al. |
| 9,020,912 | B1 | 4/2015 | Majee et al. |
| 2001/0034733 | A1 | 10/2001 | Prompt et al. |
| 2002/0188590 | A1 | 12/2002 | Curran et al. |
| 2003/0131020 | A1 | 7/2003 | Karamanolis et al. |
| 2003/0158836 | A1 | 8/2003 | Venkatesh et al. |
| 2003/0204509 | A1 | 10/2003 | Dinker et al. |
| 2004/0054648 | A1 | 3/2004 | Mogi et al. |
| 2004/0136379 | A1 * | 7/2004 | Liao ................ H04L 12/5695 370/395.21 |
| 2004/0177228 | A1 | 9/2004 | Leonhardt et al. |
| 2004/0215639 | A1 | 10/2004 | Bamford et al. |
| 2005/0097073 | A1 | 5/2005 | Mair et al. |
| 2005/0166011 | A1 | 7/2005 | Burnett et al. |
| 2005/0240714 | A1 | 10/2005 | McCauley et al. |
| 2006/0218360 | A1 | 9/2006 | Burkey |
| 2007/0055703 | A1 | 3/2007 | Zimran et al. |
| 2009/0172666 | A1 | 7/2009 | Yahalom et al. |
| 2009/0271412 | A1 | 10/2009 | Lacapra et al. |
| 2009/0276566 | A1 | 11/2009 | Coatney et al. |
| 2010/0299495 | A1 | 11/2010 | Frank |
| 2010/0306280 | A1 | 12/2010 | Sapek |
| 2011/0087631 | A1 | 4/2011 | Feldman et al. |
| 2011/0238814 | A1 | 9/2011 | Pitts |
| 2011/0238857 | A1 * | 9/2011 | Certain et al. ................ 709/232 |
| 2012/0005435 | A1 | 1/2012 | Emaru et al. |
| 2012/0137066 | A1 | 5/2012 | Nolterieke et al. |
| 2012/0239896 | A1 | 9/2012 | Sobel |
| 2012/0303322 | A1 | 11/2012 | Rego et al. |
| 2013/0185413 | A1 | 7/2013 | Beaty et al. |
| 2013/0204849 | A1 | 8/2013 | Chacko |
| 2013/0311989 | A1 | 11/2013 | Ota et al. |
| 2014/0115579 | A1 * | 4/2014 | Kong ............................ 718/1 |
| 2014/0130055 | A1 | 5/2014 | Guha |
| 2014/0156925 | A1 | 6/2014 | Baron et al. |
| 2014/0201736 | A1 * | 7/2014 | Mizrahi et al. ................ 718/1 |

FOREIGN PATENT DOCUMENTS

| | | |
|---|---|---|
| JP | 2006-107501 A | 4/2006 |
| JP | 2008527555 A | 7/2008 |
| JP | 2009217475 A | 9/2009 |
| JP | 2010-044789 A | 2/2010 |
| JP | 2010055369 A | 3/2010 |
| JP | 2010-186223 A | 8/2010 |
| WO | 2008109321 A1 | 9/2008 |
| WO | 2010048048 A2 | 4/2010 |
| WO | 2011108027 A1 | 9/2011 |
| WO | 2012090247 A1 | 7/2012 |
| WO | 2012104912 A1 | 8/2012 |

OTHER PUBLICATIONS

International Search Report and Written Opinion dated Dec. 8, 2014, International Application No. PCT/US2014/041172, 15pages.

Adam et al.., "Regeneration with Virtual Copies for Replicated Databases" IEEE Comp. Soc. Press, US. May 20, 1991, p. 429-436.

Hu et al., "Performance Evaluation of Dynamic Supporting Algorithms" IEEE Sep. 21, 1992, pp. 90-95.

Jacek Migdal. 2011. Data Block Encoding of KeyValues (aka delta encoding I prefix compression). The Apache Software Foundation HBase. https://issues.apache.org/jira/browse/HBASE-4218.

Jonathan Gray. 2009. Concurrent LRU Block Cache. The Apache Software Foundation HBase. https://issues/apache.org/jira/browse/HBASE-1460.

Bishwaranjan Bhattacharjee, Lipyeow Lim, Timothy Malkemus, George Mihaila, Kenneth Ross, Sherman Lau, Cathy McArthur, Zoltan Toth, and Reza Sherkat. 2009. Efficient index compression in DB2 LUW. Proc. VLDB Endow. 2, 2 (Aug. 2009), 1462-1473. DOI=10.14778/1687553.1687573 http://dx.doi.org/1 0.14 778/1687553.1687573.

Direct Attached Storage. Article [online]. Apex Microsystems, 2009 [retrieved on May 4, 2016]. Retrieved from the Internet <http://www.apexmicrosystem.com/?page_id+518>.

"Virtual Drive", Web Page <http://searchservervirtualization.techtarget.com/definition/virtual-drive>, Jun. 14, 2012, retrieved from Internet Archive Wayback Machine <https ://web.archive.org/web/20120614001609/http://searchservervirtualization.techtarget.com/definition/virtual-drive> on Feb. 3, 2016.

Austrailian Search Report dated Sep. 1, 2016 in related Australian Patent Application 2014311781.

Austrailian Search Report dated Jan. 16, 2017 in related Australian Patent Application 2014311869.

Japanese Office Action dated Feb. 21, 2017 in related Japanese Patent Application 2016-529769, 7 pages.

Japanese Office Action dated Jan. 10, 2017 in related Japanese Patent Application 2016-531609, 7 pages.

Vocabulary.com Article [online]. Vocabulary.com, Sep. 10, 2012 [retrieved on Aug. 30, 2016]. Retrieved from the Internet <https://web.archive.org/web/20120910033525/http://www.vocabulary.com/dictionary/incorporated>.

Final Office Action dated Jul. 12, 2017 in related U.S. Appl. No. 14/010,316.

Final Office Action dated May 4, 2017 in related U.S. Appl. No. 14/010,275.

International Search Report and Written Opinion dated Sep. 5, 2014, International Application No. PCT/US2014/041757, 8 pages.

International Search Report and Written Opinion dated Sep. 1, 2014, International Application No. PCT/US2014/041764, 11 pages.

International Search Report and Written Opinion dated Oct. 1, 2014, International Application No. PCT/US2014/041164, 9 pages.

Japanese Office Action dated Jun. 27, 2017 in related Japanese Patent Application 2016-529768, 7 pages.

Japanese Office Action dated Nov. 21, 2017, filed in Japanese counterpart Application No. 2016-529768, 6 pages (with concise statement).

* cited by examiner

US 9,887,924 B2

DISTRIBUTED POLICY-BASED PROVISIONING AND ENFORCEMENT FOR QUALITY OF SERVICE

CROSS-REFERENCE TO RELATED APPLICATIONS

This application is related to the following commonly assigned, co-pending applications: "Load Balancing of Resources" (Ser. No. 14/010,275), "Scalable Distributed Storage Architecture" (Ser. No. 14/010,293), and "Virtual Disk Blueprints for a Virtualized Storage Area Network" (Ser. No. 14/010,316), each of which was filed on Aug. 26, 2013. Each related application is incorporated by reference herein in its entirety.

BACKGROUND

Distributed systems allow multiple clients in a network to access a pool of shared resources. For example, a distributed storage system allows a cluster of host computers to aggregate local disks (e.g., SSD, PCI-based flash storage, SATA, or SAS magnetic disks) located in or attached to each host computer to create a single and shared pool of storage. This pool of storage (sometimes referred to herein as a "datastore" or "store") is accessible by all host computers in the cluster and may be presented as a single namespace of storage entities (such as a hierarchical file system namespace in the case of files, a flat namespace of unique identifiers in the case of objects, etc.). Storage clients in turn, such as virtual machines spawned on the host computers may use the datastore, for example, to store virtual disks that are accessed by the virtual machines during their operation. Because the shared local disks that make up the datastore may have different performance characteristics (e.g., capacity, input/output per second or IOPS capabilities, etc.), usage of such shared local disks to store virtual disks or portions thereof may be distributed among the virtual machines based on the needs of each given virtual machine.

This approach provides enterprises with cost-effective performance. For instance, distributed storage using pooled local disks is inexpensive, highly scalable, and relatively simple to manage. Because such distributed storage can use commodity disks in the cluster, enterprises do not need to invest in additional storage infrastructure. However, one issue that arises with this approach relates to contention between multiple clients accessing the shared storage resources. In particular, reduced overall performance and higher latency occur when multiple clients need to simultaneously access different data that is backed by the same local disk in a particular host computer at a combined IOPS (input/output per second) that exceeds the IOPS capacity of the local disk.

SUMMARY

One embodiment of the present disclosure provides a method for providing resource usage feedback to a plurality of clients having access to a shared resource. The method generally includes monitoring a rate of usage of the shared resource by at least a portion of the clients, wherein each client has been reserved a minimum usage rate for the shared resource. Upon detecting that the rate of usage of the shared resource has exceeded a maximum rate supported by the shared resource, congestion metric is determined for at least a portion of the clients that are currently attempting to access the shared resource. The congestion metric for each client is based on the client's usage of the shared resource and is used by the clients to calculate a delay period prior attempting another access of the shared resource. The method generally includes transmitting each of the determined congestion metrics to a corresponding client.

Other embodiments include, without limitation, a computer-readable medium that includes instructions that enable a processing unit to implement one or more aspects of the disclosed methods as well as a computer system having a processor, memory, and modules configured to implement one or more aspects of the disclosed methods.

DETAILED DESCRIPTION

Figure 1:
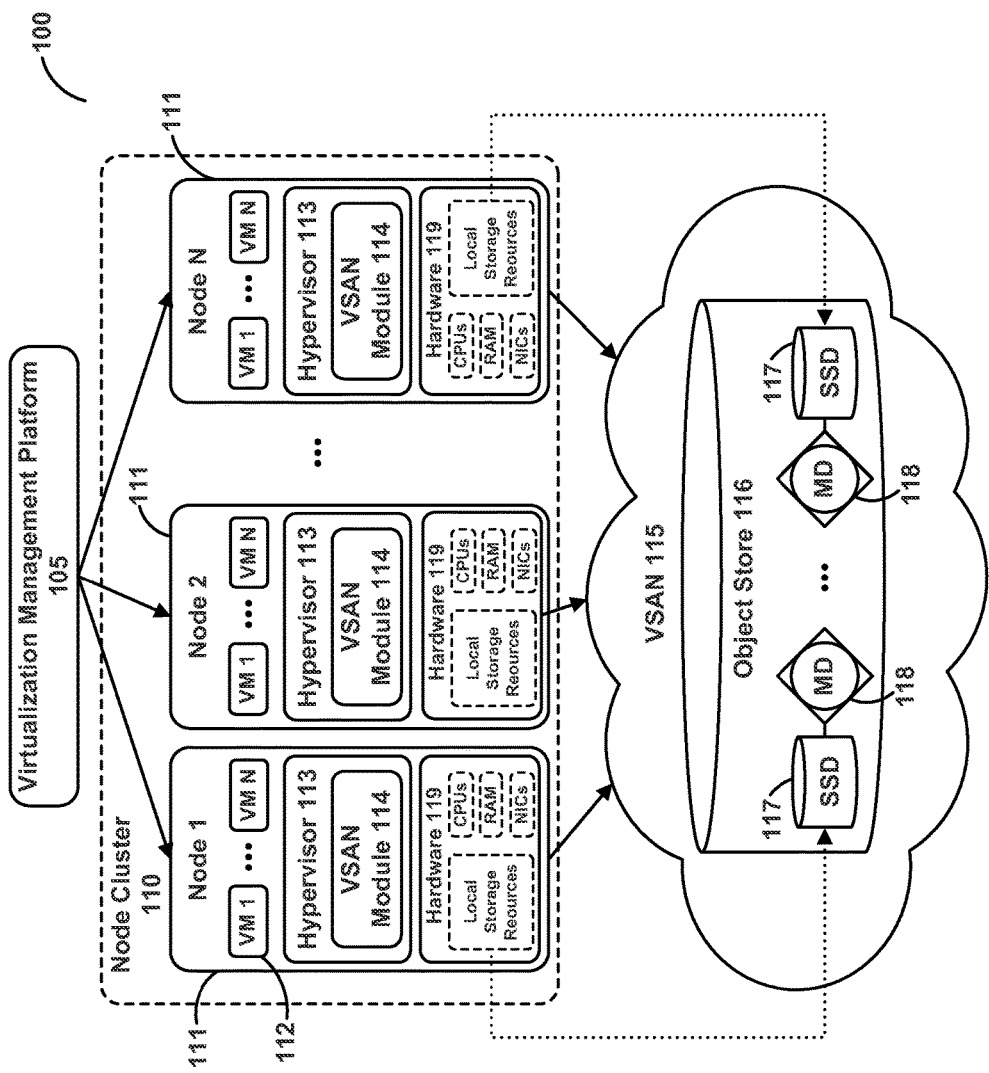
FIG. 1 illustrates an example computing environment, according to one embodiment.

Embodiments disclosed herein provide techniques for measuring congestion at a shared resource (e.g., storage, etc.) and controlling the quality of service provided to consumers of the shared resource. In one embodiment, a host computer providing a shared resource (e.g., its local storage, etc.) to a cluster of host computers monitors the usage of the shared resource (e.g., IOPS, etc.) of clients (e.g., virtual machines running on any of the host computers in the cluster, etc.) accessing the resource. If there is contention between clients for the shared resource (e.g., if certain clients are unable to access the shared resource at a minimum rate that has been reserved to them as further described herein) because certain of such clients are exceeding their own reserved rates, the host computer issues a congestion metric to at least a portion of the clients trying to access the shared resource. The congestion metric may specify the extent of resource contention. Clients use the congestion metric to determine how long to delay subsequent requests (e.g., I/O operations, etc.) to access the shared resource. For example, in certain embodiments, clients may receive a non-zero congestion metric (e.g., clients that have exceeded their reserved rates) that may cause them to delay requests for a period of time based on the congestion metric, while other clients may receive a "zero" congestion metric (e.g., clients that have used resources within the rates reserved for them) may send requests immediately. The computer hosting the storage resources may calibrate the response to the congestion metric so that a given client has a total service time similar to what the client may have had if all requests had been delivered immediately.

For instance, the techniques described herein may be used to implement a distributed storage system where the host computer issues congestion metrics on I/O operation requests by clients that may be located on other host computers that are accessing the local storage of the host computer. One example of an applicable distributed storage system is a software-based "virtual storage area network" (VSAN) where host servers in a cluster each act as a node that contributes its commodity local storage resources (e.g., hard disk and/or solid state drives, etc.) to provide an aggregate "object" store. Each host server may include a storage management module (also referred to herein as a VSAN module) in order to automate storage management workflows (e.g., create objects in the object store, etc.) and provide access to objects in the object store (e.g., handle I/O operations to objects in the object store, etc.) based on predefined storage policies specified for objects in the object store. In a particular embodiment, the host servers further support the instantiation of virtual machines (VMs) which act as clients to the VSAN object store. In such an embodiment, the "objects" stored in the object store may include, for example, file system objects that may contain VM configuration files and virtual disk descriptor files, virtual disk objects that are accessed by the VMs during runtime and the like.

An administrator may initially configure a VM with specific storage requirements for its "virtual disk" depending its intended use (e.g., capacity, availability, IOPS, etc.), the administrator may define a storage profile or policy for each VM specifying such availability, capacity, IOPS and the like. As further described below, the VSAN module may then create a virtual disk for the VM backing it with physical storage resources of the object store based on the defined policy. For example, an administrator may specify a storage policy for a virtual disk for VM A that requires a minimum reservation of 400 read IOPS (but having no limit on the maximum amount of read IOPS it can consume), and accordingly, the VSAN module may create a virtual disk "object" backed by a local storage resource that can provide a maximum of 550 read IOPS. Further, the administrator may specify another storage policy for a virtual disk for VM B that requires a minimum reservation of 100 read IOPS (but, again, having no limit on the maximum amount of read IOPS it can consume). The VSAN module may also back the virtual disk for VM B with the same local storage resource (and therefore be left with 50 read IOPS remaining) If VM A exceeds its minimum reservation of 400 read IOPS and, for example, utilizes 500 read IOPS, VM B can continue performing I/O operations to its virtual disk at a rate of 50 read IOPS without experiencing contention for the local storage resource. However, if VM A continues to perform I/O on its virtual disk at 500 read IOPS, and VM B needs to use its minimally reserved amount of 100 read IOPS to access its own virtual disk, contention will occur.

In one embodiment, the VSAN module on each node (e.g., host server) monitors the rate at which the local storage resources on the node are being accessed by clients (such as, for example, other VSAN modules on other nodes that are acting on behalf of VMs running on such nodes). In one embodiment, the VSAN module residing in each node may broadcast the current resource usage status to other VSAN modules of other nodes in the cluster. When contention occurs at a local storage resource, for example, due to simultaneous access by multiple clients, the node calculates a congestion metric that is then issued to the clients attempting to access the local storage resource. The congestion metric may indicate a measure of how much contention is occurring, which may cause the clients (e.g., the VSAN modules acting on behalf of VMs that are performing I/O operations that reach the local storage resource) to delay or otherwise throttle back their I/O operation requests. In certain embodiments, the VSAN module in the node may also itself use the congestion metric to queue and delay incoming requests to the local storage resource.

Alternatively, the VSAN module of the host computer hosting the storage resources calculates the amount of congestion to the resources. Once determined, the VSAN module transmits the congestion metric to the client without calculating the resource usage of a particular client. Upon receiving the congestion metric from the host computer, the client calculates a delay period based on its own resource usage and whether it is exceeding allotted resources.

This approach allows for distributed provisioning and decentralized policy enforcement across multiple clients. By disaggregating a single large queue at a server (e.g., node housing the local storage resource) to a smaller queue at the server and separate queues at each client (where the overall average queuing delay per request is what would be seen using a single large queue), this approach reduces space needed for buffering at the server while still allowing differential priority scheduling among the requests of each client. Further, because only clients that exceed their reserved allocation for resources (and not the clients that are using resources as reserved for them) delay requests to the VSAN module, such an approach requires less complicated logic, resulting in improved performance of the distributed system.

Reference is now made in detail to several embodiments, examples of which are illustrated in the accompanying figures. Note, that wherever practicable, similar or like reference numbers may be used in the figures and may indicate similar or like functionality. The figures depict embodiments for purposes of illustration only. One having skill in the art will readily recognize from the following description that alternative embodiments of the structures and methods illustrated herein may be employed without departing from the principles described herein.

In the following, a VSAN module provides as a reference example of a system that monitors resources and controls the congestion of resources at multiple points. This reference example is included to provide an understanding of the embodiments described herein. However, it will be apparent to one of skill in the art that these embodiments are applicable in other contexts related to allocating distributed storage resources to clients, regardless of the type of computing environment. For example, the embodiments may be applicable to software defined computers, networks, and storage arrays. Further, the embodiments may also be applicable in other contexts relating to allocating other shared computing resources (e.g., processing, memory and network resources, etc.).

Similarly, numerous specific details are provided to provide a thorough understanding of the embodiments. One of skill in the art will recognize that the embodiments may be practiced without some of these specific details. In other instances, well known process operations and implementation details have not been described in detail to avoid unnecessary obscuring of novel aspects of the disclosure.

FIG. 1 illustrates a computing environment 100, according to one embodiment. As shown, computing environment 100 is a VSAN environment that leverages the commodity local storage housed in or directly attached (hereinafter, use of the term "housed" or "housed in" may be used to encompass both housed in or otherwise directly attached) to host servers or nodes 111 of a cluster 110 to provide an aggregate object store 116 to virtual machines (VMs) 112 running on the nodes. The local commodity storage housed in or otherwise directly attached to the nodes 111 may include combinations of solid state drives (SSDs) 117 and/or magnetic or spinning disks 118. In certain embodiments, SSDs 117 serve as a read cache and/or write buffer in front of magnetic disks 118 to increase I/O performance.

A virtualization management platform 105 is associated with cluster 110 of nodes 111. Virtualization management platform 105 enables an administrator to manage the configuration and spawning of VMs on the various nodes 111. As depicted in the embodiment of FIG. 1, each node 111 includes a virtualization layer or hypervisor 113, a VSAN module 114, and hardware 119 (which includes the SSDs 117 and magnetic disks 118 of a node 111). Through hypervisor 113, a node 111 is able to launch and run multiple VMs 112. Hypervisor 113, in part, manages hardware 119 to properly allocate computing resources (e.g., processing power, random access memory, etc.) for each VM 112. Furthermore, as described further below, each hypervisor 113, through its corresponding VSAN module 114, provides access to storage resources located in hardware 119 (e.g., SSDs 117 and magnetic disks 118) for use as storage for virtual disks (or portions thereof) and other related files that may be accessed by any VM 112 residing in any of nodes 111 in cluster 110. In a particular embodiment, vSphere Hypervisor from VMware, Inc. (VMware) may be installed on nodes 111 as hypervisor 113 and vCenter Server from VMware may be used as virtualization management platform 105.

In one embodiment, VSAN module 114 is implemented as a "VSAN" device driver within hypervisor 113. In such an embodiment, VSAN module 114 provides access to a conceptual "VSAN" 115 through which an administrator can create a number of top-level "device" or namespace objects that are backed by object store 116. In one common scenario, during creation of a device object, the administrator may specify a particular file system for the device object (such device objects hereinafter also thus referred to "file system objects"). For example, in one embodiment, each hypervisor 113 in each node 111 may, during a boot process, discover a /vsan/ root node for a conceptual global namespace that is exposed by VSAN module 114. By, for example, accessing APIs exposed by VSAN module 114, hypervisor 113 can then determine all the top-level file system objects (or other types of top-level device objects) currently residing in VSAN 115. When a VM (or other client) attempts to access one of the file system objects, hypervisor 113 may dynamically "auto-mount" the file system object at that time. A file system object (e.g., /vsan/fs_name1, etc.) that is accessible through VSAN 115 may, for example, be implemented to emulate the semantics of a particular file system such as VMware's distributed or clustered file system, VMFS, which is designed to provide concurrency control among simultaneously accessing VMs. Because VSAN 115 supports multiple file system objects, it is able provide storage resources through object store 116 without being confined by limitations of any particular clustered file system. For example, many clustered file systems (e.g., VMFS, etc.) can only scale to support a certain amount of nodes 111. By providing multiple top-level file system object support, VSAN 115 overcomes the scalability limitations of such clustered file systems.

As described in further detail in the context of FIG. 2 below, a file system object, may, itself, provide access to a number of virtual disk descriptor files (e.g., .vmdk files in a vSphere environment, etc.) accessible by VMs 112 running in cluster 110. These virtual disk descriptor files contain references to virtual disk "objects" that contain the actual data for the virtual disk and are separately backed by object store 116. A virtual disk object may itself be a hierarchical or "composite" object that, as described further below, is further composed of "component" objects (again separately backed by object store 116) that reflect the storage requirements (e.g., capacity, availability, IOPs, etc.) of a corresponding storage profile or policy generated by the administrator when initially creating the virtual disk. As further discussed below, each VSAN module 114 (through a cluster level object management or "CLOM" sub-module, in embodiments as further described below) communicates with other VSAN modules 114 of other nodes 111 to create and maintain an in-memory metadata database (e.g., maintained separately but in synchronized fashion in the memory of each node 111) that contains metadata describing the locations, configurations, policies and relationships among the various objects stored in object store 116. This in-memory metadata database is utilized by a VSAN module 114 on a node 111, for example, when an administrator first creates a virtual disk for a VM as well as when the VM is running and performing I/O operations (e.g., read or write) on the virtual disk. As further discussed below in the context of FIG. 3, VSAN module 114 (through a document object manager or "DOM" sub-module, in one embodiment as further described below) traverses a hierarchy of objects using the metadata in the in-memory database in order to properly route an I/O operation request to the node (or nodes) that houses (house) the actual physical local storage that backs the portion of the virtual disk that is subject to the I/O operation.

Figure 2:
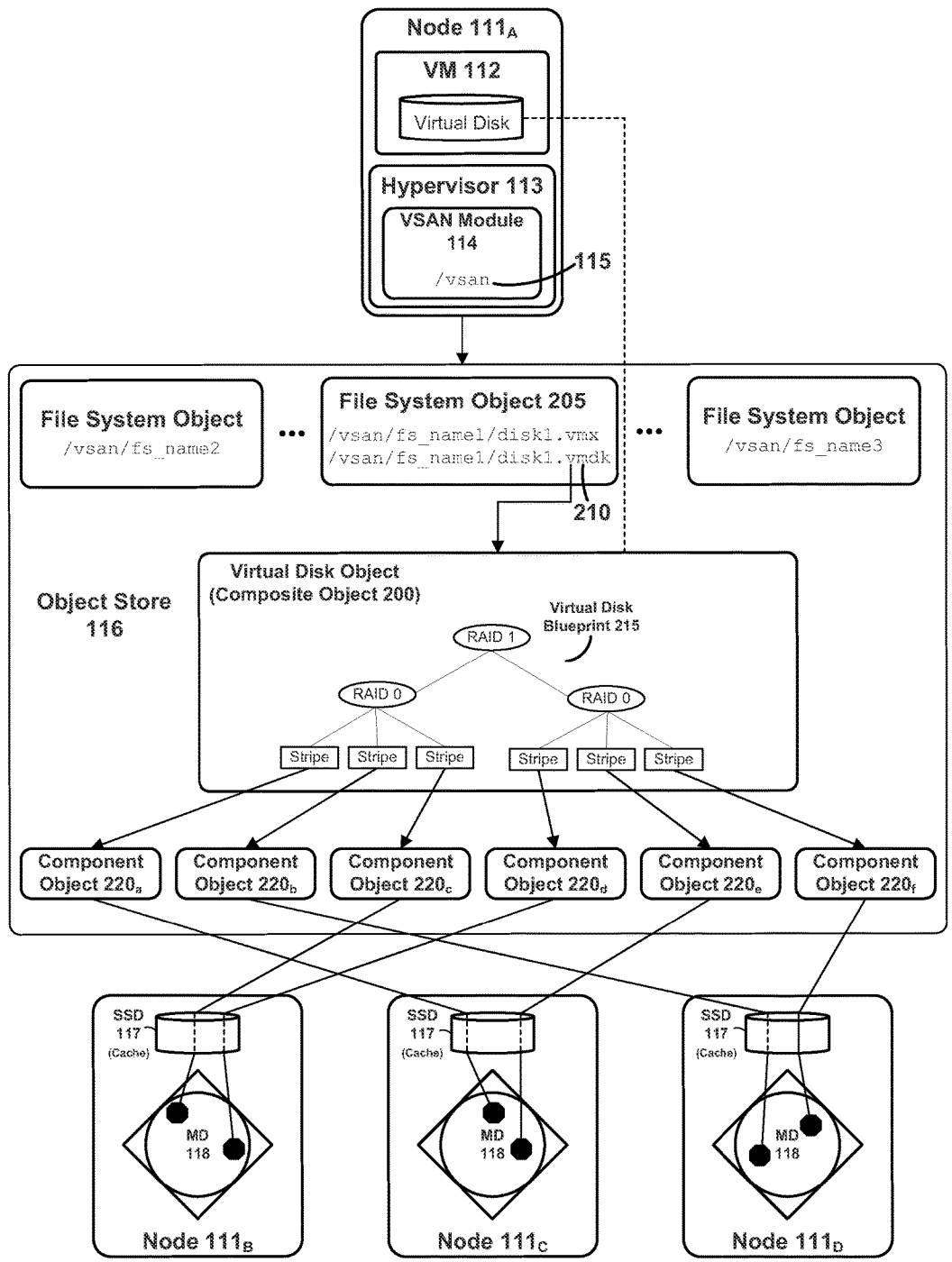
FIG. 2 illustrates an example hierarchical structure of objects organized within an object store that represent a virtual disk, according to one embodiment.

FIG. 2 illustrates an example hierarchical structure of objects organized within object store 116 that represent a virtual disk, according to one embodiment. As previously discussed above, a VM 112 running on one of nodes 111 may perform I/O operations on a virtual disk that is stored as a hierarchical or composite object 200 in object store 116. Hypervisor 113 provides VM 112 access to the virtual disk by interfacing with the abstraction of VSAN 115 through VSAN module 114 (e.g., by auto-mounting the top-level file system object corresponding to the virtual disk object, as previously discussed, in one embodiment). For example, VSAN module 114, by querying its local copy of the in-memory metadata database, is able to identify a particular file system object 205 (e.g., a VMFS file system object in one embodiment, etc.) stored in VSAN 115 that stores a descriptor file 210 for the virtual disk (e.g., a .vmdk file, etc.). It should be recognized that the file system object 205 may store a variety of other files consistent with its purpose, such as virtual machine configuration files (e.g., .vmx files in a vSphere environment, etc.) and the like when supporting a virtualization environment. In certain embodiments, each file system object may be configured to support only those virtual disks corresponding to a particular VM (e.g., a "per-VM" file system object).

Descriptor file 210 includes a reference to composite object 200 that is separately stored in object store 116 and conceptually represents the virtual disk (and thus may also be sometimes referenced herein as a virtual disk object). Composite object 200 stores metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPS, etc.) generated by an administrator when creating the virtual disk. For example, in the embodiment of FIG. 2, composite object 200 includes a virtual disk blueprint 215 that describes a RAID 1 configuration where two mirrored copies of the virtual disk (e.g., mirrors) are each further striped in a RAID 0 configuration. Composite object 225 may thus contain references to a number of "leaf" or "component" objects $220_x$ corresponding to each stripe (e.g., data partition of the virtual disk) in each of the virtual disk mirrors. The metadata accessible by VSAN module 114 in the in-memory metadata database for each component object 220 (e.g., for each stripe) provides a mapping to or otherwise identifies a particular node $111_x$ in cluster 110 that houses the physical storage resources (e.g., magnetic disks 118, etc.) that actually store the stripe (as well as the location of the stripe within such physical resource).

Figure 3:
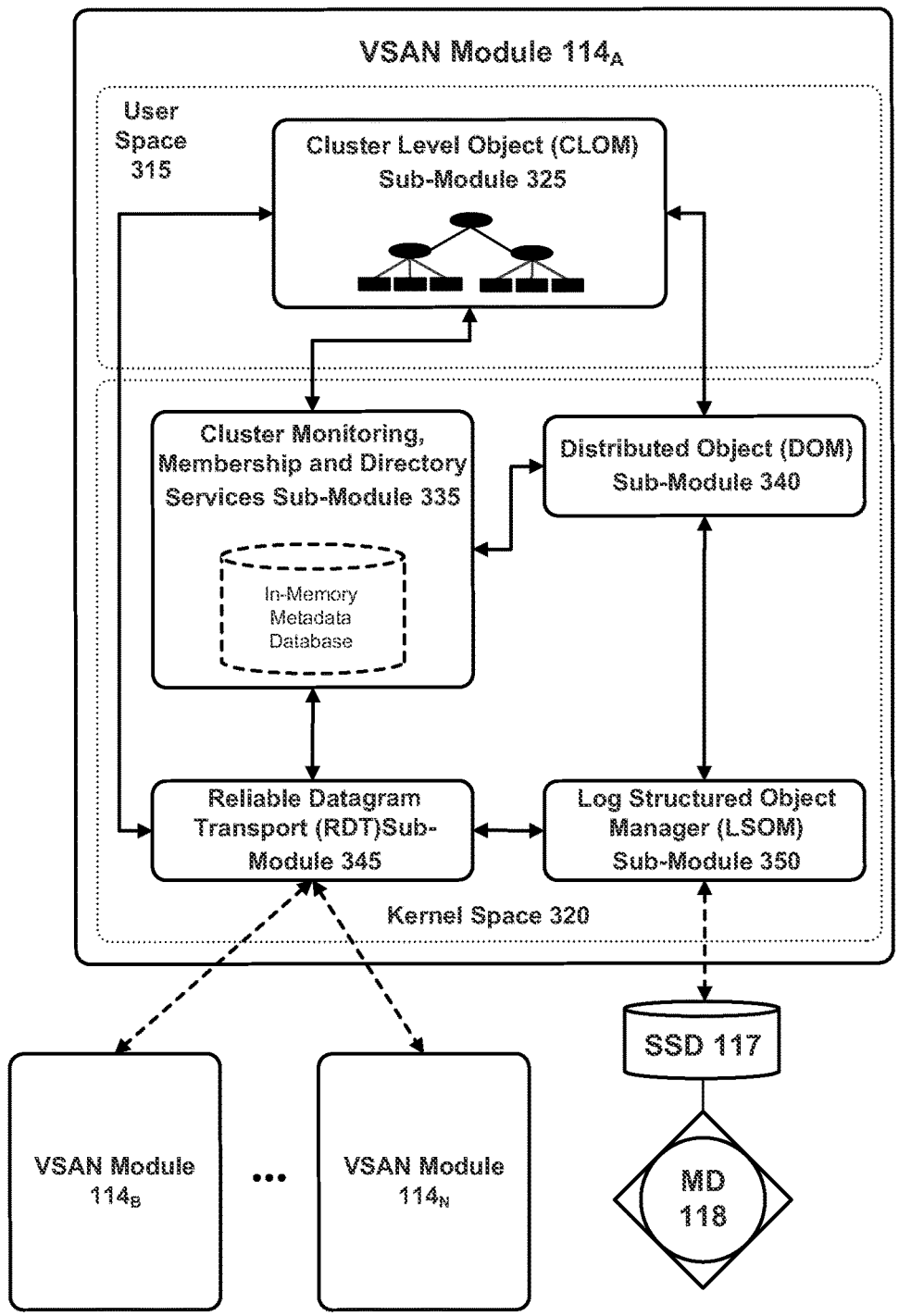
FIG. 3 illustrates components of a VSAN module, according to one embodiment.

FIG. 3 illustrates components of a VSAN module 114, according to one embodiment. As previously described, in certain embodiments, VSAN module 114 may execute as a device driver exposing an abstraction of a VSAN 115 to hypervisor 113. Various sub-modules of VSAN module 114 handle different responsibilities and may operate within either user space 315 or kernel space 320 depending on such responsibilities. As depicted in the embodiment of FIG. 3, VSAN module 114 includes a cluster level object management (CLOM) sub-module 325 that operates in user space 315. CLOM sub-module 325 generates virtual disk blueprints during creation of a virtual disk by an administrator and ensures that objects created for such virtual disk blueprints are configured to meet storage profile or policy requirements set by the administrator. In addition to being accessed during object creation (e.g., for virtual disks), CLOM sub-module 325 may also be accessed (e.g., to dynamically revise or otherwise update a virtual disk blueprint or the mappings of the virtual disk blueprint to actual physical storage in object store 116) on a change made by an administrator to the storage profile or policy relating to an object or when changes to the cluster or workload result in an object being out of compliance with a current storage profile or policy.

In one embodiment, if an administrator creates a storage profile or policy for a composite object such as virtual disk object 200, CLOM sub-module 325 applies a variety of heuristics and/or distributed algorithms to generate virtual disk blueprint 215 that describes a configuration in cluster 110 that meets or otherwise suits the storage policy (e.g., RAID configuration to achieve desired redundancy through mirroring and access performance through striping, which nodes' local storage should store certain portions/partitions/stripes of the virtual disk to achieve load balancing, etc.). For example, CLOM sub-module 325, in one embodiment, is responsible for generating blueprint 215 describing the RAID 1/RAID 0 configuration for virtual disk object 200 in FIG. 2 when the virtual disk was first created by the administrator. As previously discussed, a storage policy may specify requirements for capacity, IOPS, availability, and reliability. Storage policies may also specify a workload characterization (e.g., random or sequential access, I/O request size, cache size, expected cache hit ration, etc.). Additionally, the administrator may also specify an affinity to VSAN module 114 to preferentially use certain nodes 111 (or the local disks housed therein). For example, when provisioning a new virtual disk for a VM, an administrator may generate a storage policy or profile for the virtual disk specifying that the virtual disk have a reserve capacity of 400 GB, a reservation of 150 read IOPS, a reservation of 300 write IOPS, and a desired availability of 99.99%. Upon receipt of the generated storage policy, CLOM sub-module 325 consults the in-memory metadata database maintained by its VSAN module 114 to determine the current state of cluster 110 in order generate a virtual disk blueprint for a composite object (e.g., the virtual disk object) that suits the generated storage policy. As further discussed below, CLOM sub-module 325 may then communicate the blueprint to its corresponding distributed object manager (DOM) sub-module 340 which interacts with object space 116 to implement the blueprint by, for example, allocating or otherwise mapping component objects (e.g., stripes) of the composite object to physical storage locations within various nodes 111 of cluster 110.

In addition to CLOM sub-module 325 and DOM sub-module 340, as further depicted in FIG. 3, VSAN module 114 may also include a cluster monitoring, membership, and directory services (CMMDS) sub-module 335 that maintains the previously discussed in-memory metadata database to provide information on the state of cluster 110 to other sub-modules of VSAN module 114 and also tracks the general "health" of cluster 110 by monitoring the status, accessibility, and visibility of each node 111 in cluster 110. The in-memory metadata database serves as a directory service that maintains a physical inventory of the VSAN environment, such as the various nodes 111, the storage resources in the nodes 111 (SSD, magnetic disks, etc.) housed therein and the characteristics/capabilities thereof, the current state of the nodes 111 and there corresponding storage resources, network paths among the nodes 111, and the like. As previously discussed, in addition to maintaining a physical inventory, the in-memory metadata database further provides a catalog of metadata for objects stored in object store 116 (e.g., what composite and component objects exist, what component objects belong to what composite objects, which nodes serve as "coordinators" or "owners" that control access to which objects, quality of service requirements for each object, object configurations, the mapping of objects to physical storage locations, etc.). As previously discussed, other sub-modules within VSAN module 114 may access CMMDS sub-module 335 (represented by the connecting lines in FIG. 3) for updates to learn of changes in cluster topology and object configurations. For example, as previously discussed, during virtual disk creation, CLOM sub-module 325 accesses the in-memory metadata database to generate a virtual disk blueprint, and in order to handle an I/O operation from a running VM 112, DOM sub-module 340 accesses the in-memory metadata database to determine the nodes 111 that store the component objects (e.g., stripes) of a corresponding composite object (e.g., virtual disk object) and the paths by which those nodes are reachable in order to satisfy the I/O operation.

As previously discussed, DOM sub-module 340, during the handling of I/O operations as well as during object creation, controls access to and handles operations on those component objects in object store 116 that are stored in the local storage of the particular node 111 in which DOM sub-module 340 runs as well as certain other composite objects for which its node 111 has been currently designated as the "coordinator" or "owner." For example, when handling an I/O operation from a VM, due to the hierarchical nature of composite objects in certain embodiments, a DOM sub-module 340 that serves as the coordinator for the target composite object (e.g., the virtual disk object that is subject to the I/O operation) may need to further communicate across the network with a different DOM sub-module 340 in a second node 111 (or nodes) that serves as the coordinator for the particular component object (e.g., stripe, etc.) of the virtual disk object that is stored in the local storage of the second node 111 and which is the portion of the virtual disk that is subject to the I/O operation. If the VM issuing the I/O operation resides on a node 111 that is also different from the coordinator of the virtual disk object, the DOM sub-module 340 of the node running the VM would also have to communicate across the network with the DOM sub-module 340 of the coordinator. In certain embodiments, if the VM issuing the I/O operation resides on node that is different from the coordinator of the virtual disk object subject to the I/O operation, the two DOM sub-modules 340 of the two nodes may to communicate to change the role of the coordinator of the virtual disk object to the node running the VM (e.g., thereby reducing the amount of network communication needed to coordinate I/O operations between the node running the VM and the node serving as the coordinator for the virtual disk object).

DOM sub-modules 340 also similarly communicate amongst one another during object creation. For example, a virtual disk blueprint generated by CLOM module 325 during creation of a virtual disk may include information that designates which nodes 111 should serve as the coordinators for the virtual disk object as well as its corresponding component objects (stripes, etc.). Each of the DOM sub-modules 340 for such designated nodes is issued requests (e.g., by the DOM sub-module 340 designated as the coordinator for the virtual disk object or by the DOM sub-module 340 of the node generating the virtual disk blueprint, etc. depending on embodiments) to create their respective objects, allocate local storage to such objects (if needed), and advertise their objects to their corresponding CMMDS sub-module 335 in order to update the in-memory metadata database with metadata regarding the object. In order to perform such requests, DOM sub-module 340 interacts with a log structured object manager (LSOM) sub-module 350 that serves as the component in VSAN module 114 that actually drives communication with the local SSDs and magnetic disks of its node 111. In addition to allocating local storage for component objects (as well as to store other metadata such a policies and configurations for composite objects for which its node serves as coordinator, etc.), LSOM sub-module 350 additionally monitors the flow of I/O operations to the local storage of its node 111, for example, to report whether a storage resource is congested.

FIG. 3 also depicts a reliable datagram transport (RDT) sub-module 345 that delivers datagrams of arbitrary size between logical endpoints (e.g., nodes, objects, etc.), where the endpoints may potentially be over multiple paths. In one embodiment, the underlying transport is TCP. Alternatively, other transports such as RDMA may be used. RDT sub-module 345 is used, for example, when DOM sub-modules 340 communicate with one another, as previously discussed above to create objects or to handle I/O operations. In certain embodiments, RDT module 345 interacts with CMMDS module 335 to resolve the address of logical endpoints dynamically in order to maintain up-to-date location information in the in-memory metadata database as well as to create, remove, or reestablish connections based on link health status. For example, if CMMDS module 335 reports a link as unhealthy, RDT sub-module 345 may drop the connection in favor of a link in better condition.

Figure 4:
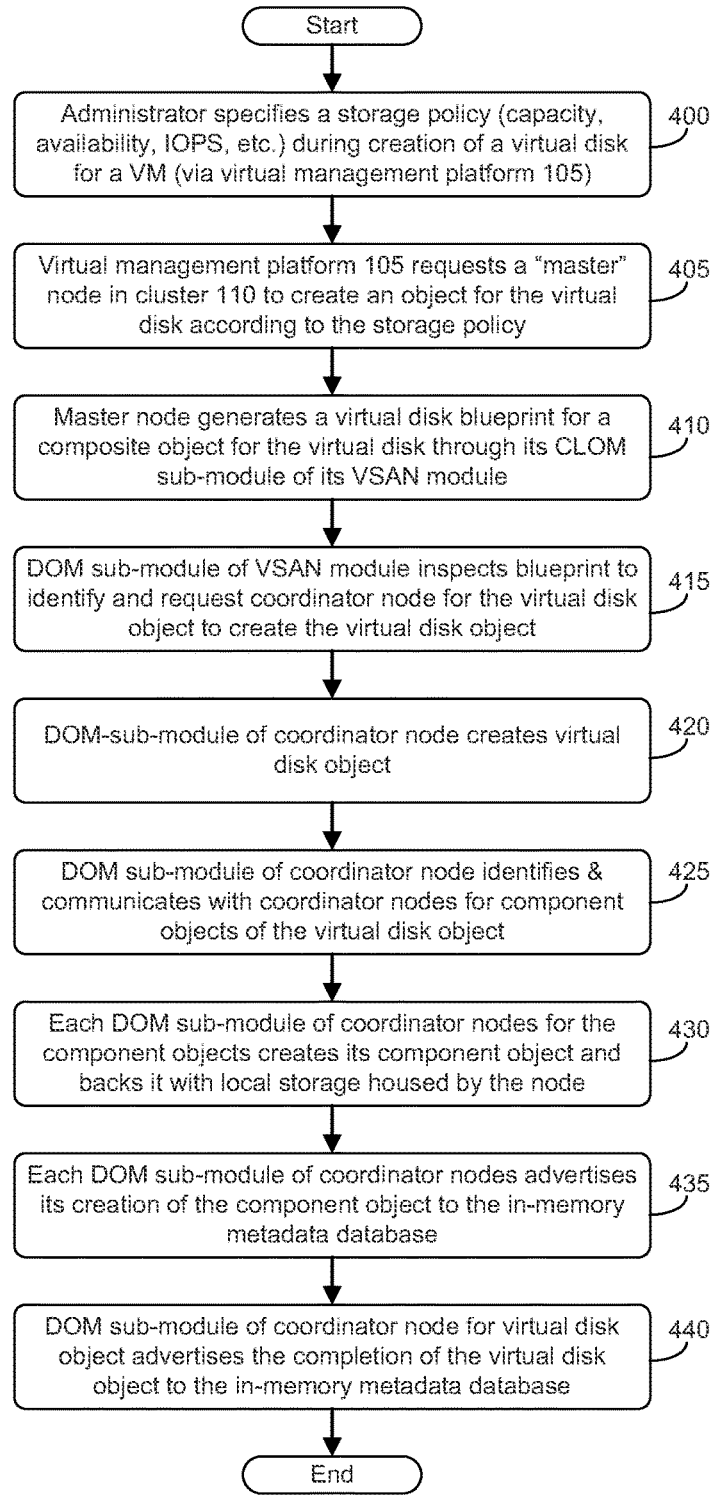
FIG. 4 illustrates a method flow diagram for creating a virtual disk object based on a defined storage policy, according to one embodiment.

FIG. 4 illustrates a method flow diagram for creating a virtual disk object based on a defined storage policy, according to one embodiment. For example, in step 400, an administrator may interact with a user interface of virtual management platform 105 to create a virtual disk having capacity, availability and IOPS requirements (e.g., the defined storage policy). In one embodiment, virtual management platform 105 may then request a "master" node 111 to create an object for the virtual disk in step 405. In step 410, such a master node 111 may generate a virtual disk blueprint through its CLOM sub-module 325 in VSAN module. As previously discussed, CLOM sub-module 35 generates a virtual disk blueprint for the creation of a virtual disk object (e.g., a composite object) based on the status of cluster 110 as determined by consulting the in-memory metadata database of CMMDS sub-module 335. The virtual disk blueprint may identify a particular node that should serve as the coordinator or owner of the virtual disk object. In step 415, the DOM sub-module 340 of the master node 111 may the request the DOM sub-module 340 of the identified node to create the virtual disk object. In step 420, the DOM sub-module 340 of the identified node receives the request and creates the virtual disk object, by, for example, communicating with its corresponding the LSOM sub-module 350 to persistently store metadata describing the virtual disk object in its local storage. In step 425, the DOM sub-module 340, based on the virtual disk object blueprint, identifies those others nodes in cluster 110 that have been designated to serve as the coordinator or owner for any component objects in the virtual disk blueprint. The DOM sub-module 340 communicates (e.g., using its RDT sub-module 345) with the DOM sub-modules 340 of the other nodes that will serve as coordinators for the component objects and store the data backing such component objects in their local storage. When such DOM sub-modules 340 receive a request from the DOM sub-module 340 of the coordinator of the virtual disk object to create their respective component objects, they, in turn in step 430, communicate with their respective LSOM modules 350 to allocate local storage for the component object (and its related metadata). Once such component objects have been created, their DOM sub-modules 340 advertise the creation of the components to the in-memory metadata database of its CMMDS sub-module 335 in step 435. In step 440, in turn, the DOM sub-module 340 for the coordinator of the virtual disk object also advertises its creation to its CMMDS sub-module 335 to update the in-memory metadata database and ultimately transmits an acknowledgement to the administrator (e.g., via the master node communications back to virtual management platform 105).

Figure 5:
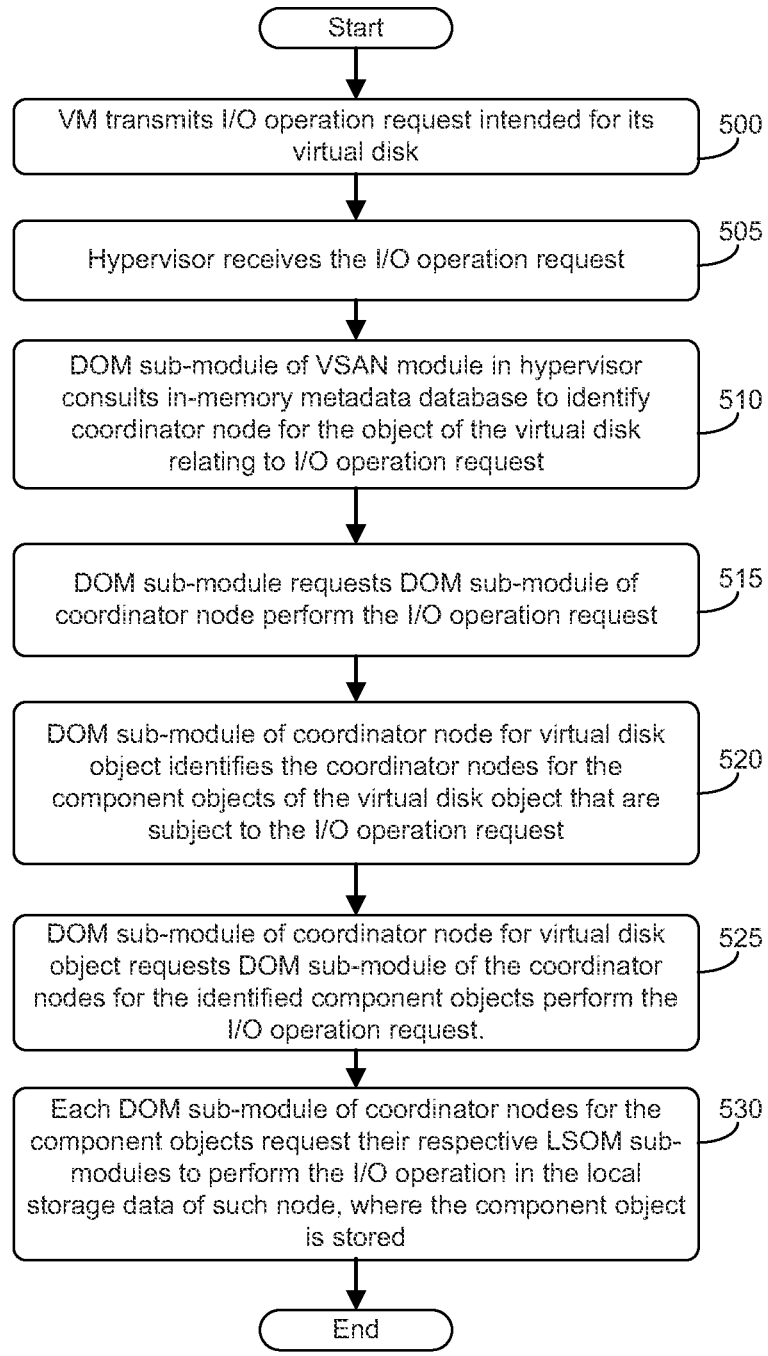
FIG. 5 illustrates the handling of an I/O operation originating from a VM, according to one embodiment.

FIG. 5 illustrates the handling of an I/O operation originating from a VM, according to one embodiment. When a VM running on a particular node performs I/O operations to its virtual disk, the VM's guest operating system, in step 500, transmits an I/O operation request intended for its virtual disk (through a device driver of the guest operating system) which, in step 505, is received by hypervisor 113 and ultimately transmitted and transformed through various layers of an I/O stack in hypervisor 113 to DOM sub-module 340 of VSAN module 114. In step 510, the I/O request received by DOM sub-module 340 includes a unique identifier for an object representing the virtual disk that DOM sub-module 340 uses to identify the coordinator node of the virtual disk object by accessing the in-memory metadata database of CMMDS sub-module 335 (in certain embodiments, accessing the in-memory metadata database to look up a mapping of the identity of the coordinator node to the unique identifier occurs only when the virtual disk object is initially accessed, with such mapping persisting for future I/O operations such that subsequent lookups are not needed). Upon identifying the coordinator node for the virtual disk object, the DOM sub-module 340 of the node running the VM communicates (e.g., using its RDT sub-module 345) with the DOM sub-module 340 of the coordinator node to request that it perform the I/O operation in step 515. As previously discussed, in certain embodiments, if the node running the VM and the node serving as coordinator of the virtual disk object are different, the two DOM sub-modules will communicate to update the role of the coordinator of the virtual disk object to be the node of the running VM. Upon the coordinator's receipt of the I/O request, in step 520, its DOM sub-module identifies (e.g., by again referencing the in-memory metadata database, in certain embodiments) those coordinator nodes for the particular component objects (e.g., stripes) of the virtual disk object that are subject to the I/O operation. For example, if the I/O operation spans multiple stripes (e.g., multiple component objects) of a RAID 0 configuration, DOM sub-module 340 may split the I/O operation and appropriately transmit correspond I/O requests to the respective coordinate nodes for the relevant component objects that correspond to the two stripes. In step 525, the DOM sub-module of the coordinator node for the virtual disk object requests that the DOM sub-modules for the coordinator nodes of the identified component objects perform the I/O operation request and, in step 530, the DOM sub-modules of such coordinator nodes for the identified component objects interact with their corresponding LSOM sub-modules to perform the I/O operation in the local storage resource where the component object is stored.

In certain situations, it should be recognized that multiple clients (e.g., other VSAN modules 114 acting on behalf of running VMs) may simultaneously send requests to perform I/O operations on a particular local storage resource located in a particular node at any given time. For example, the component objects (e.g., stripes, etc.) of different virtual disk objects corresponding to different VMs may be backed by the same local storage on the same node. Upon receiving an I/O operation, the VSAN module 114 of such a node may place the I/O operation into a storage resource queue for processing. To reduce the possibility of congestion or overflow in the I/O queue for the local storage resource caused, for example, by multiple clients accessing component objects, the VSAN module 114 (via its LSOM sub-module, as previously discussed) monitors usage of the local storage resource and may issue a congestion metric to the clients attempting to access the local storage. The congestion metric, discussed in greater detail below, provides a measure by which a client may calculate a delay prior to sending additional I/O requests to the local storage resource.

Figure 6:
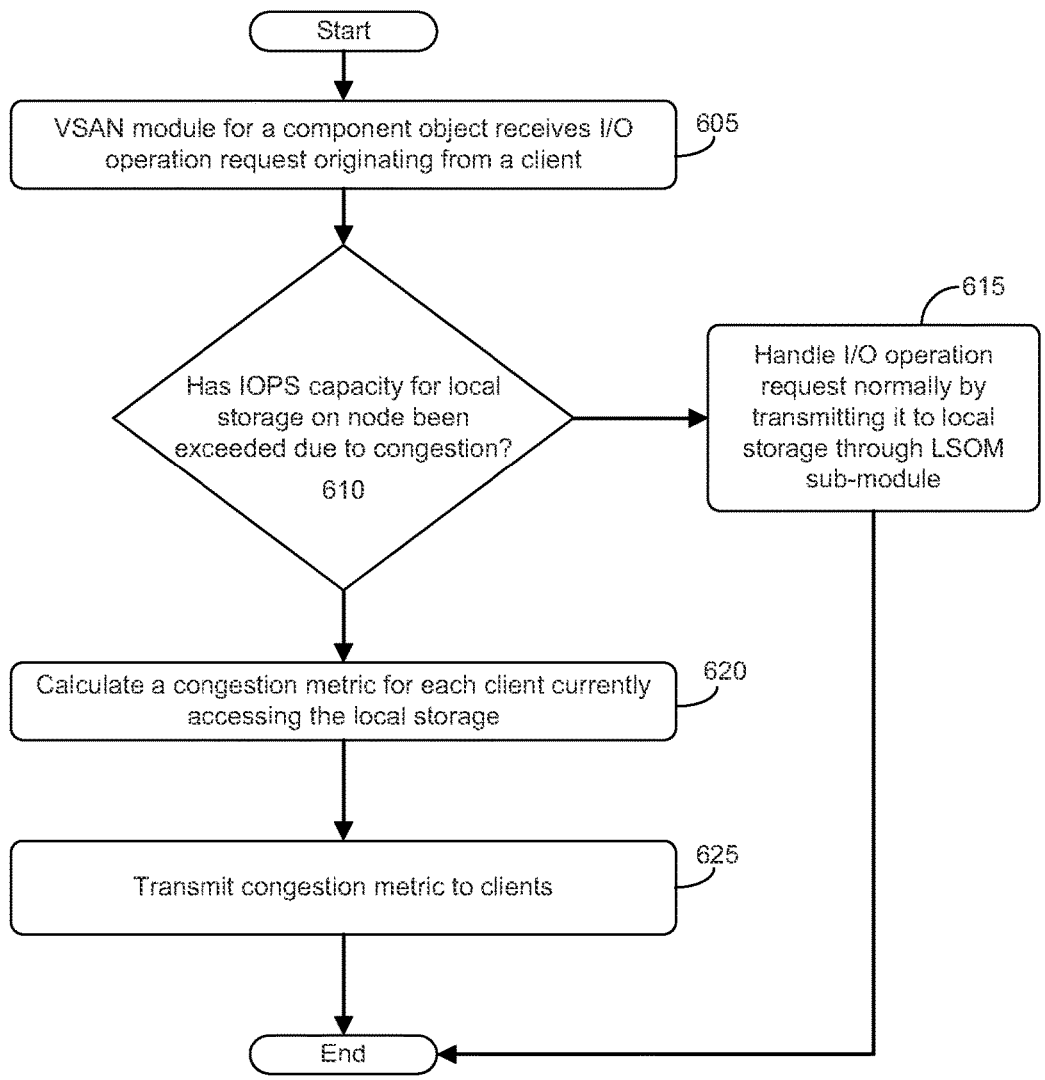
FIG. 6 illustrates a method flow diagram for transmitting congestion metrics to clients by a VSAN module, according to an embodiment.

FIG. 6 illustrates a method flow diagram for transmitting congestion metrics to clients by a VSAN module, according to one embodiment. For example, components of different composite objects may reside in the same node and contend for the shared local resources, such as SSD and magnetic disk IOPS. As previously stated, the LSOM sub-module 350 of each node includes the configuration of the local component objects and policies as applied to each component. Further, LSOM sub-module 350 monitors the resource usage of component objects to ensure that the component objects adhere to the policy. If a client accessing a component object (e.g., other VSAN modules acting on behalf of running VMs) exceeds the allotment of IOPS for that object, the VSAN module 114 (through its LSOM sub-module 350) sends a congestion metric to the client, upon which the client delays subsequent I/O requests. In step 605, a VSAN module 114 of a node 111 in cluster 110 receives an I/O operation request originating from the client accessing a component object residing in node 111. For example, the VSAN module 114 (through its DOM sub-module 340) may serve as the coordinator for a component object (e.g., stripe, etc.) of a virtual disk object corresponding to the running VM. In step 610, once it receives the I/O operation request, the VSAN module 114 (through its LSOM sub-module 350) determines whether the IOPS capacity of the local storage resource backing the component object has been exceeded (e.g., resulting in contention and potential congestion) due to other clients that might be accessing the same local storage to, for example, access other different component objects that comprise their corresponding virtual disk objects. If there is no contention, then, in step 615, VSAN module 114 proceeds to handle the I/O operation request by communicating with its LSOM sub-module 350 to access the local storage resource.

However, if the IOPS capacity of the local storage resource has been exceeded, then in step 620, the local LSOM sub-module 350 calculates a congestion metric for any client that is currently conducting I/O with the local storage resource and has exceeded the IOPS reservations specified in their storage policies. In one embodiment, LSOM sub-module 350 calculates the congestion metric using a time-weighted sum (e.g., by decaying previous values and adding recent congestion measurements). Furthermore, in certain embodiments, LSOM sub-module 350 also may calculate a different congestion metric for each client based on the client's usage of the local storage resource relative to the usage by other clients of the local storage resource. In one embodiment, if the client is accessing multiple local storage resources located in different nodes of cluster 110 (e.g., an I/O operation originating from the client is split into multiple I/O operations directed towards different component objects), VSAN module 114 may communicate with the VSAN modules 114 of the other nodes (through LSOM sub-modules 350) to combine its congestion metrics with possible congestion metrics generated from the other VSAN modules residing in the other nodes to produce an overall congestion metric for the client.

In step 625, the VSAN module 114 sends the congestion metric to the clients. Upon receipt, the clients, through DOM sub-module 340, use the congestion metric to determine how long to delay subsequent I/O operation requests based on the amount of resources the client is using and the amount of congestion described by the congestion metric. That is, rather than forcing a fixed period of delay on clients that are overusing resources (such an approach may lead to unwanted oscillations in usage), in certain embodiments, the congestion metric provides the client with information to calculate a randomized delay period from a distribution proportional to the metric. Because the service costs required for read and write operations differ, the wait period required by the congestion metric may depend on the type and size of the I/O operation. For example, a congestion metric may require a longer delay period for a write operation than a read operation because generally, write operations are more computationally expensive than read operations.

In one alternative embodiment, the VSAN module may issue a different congestion metric to every client accessing the local storage resource regardless of whether such client is exceeding its reserved allocations. While the congestion metrics transmitted to clients exceeding their reserved allocation may result in such clients delaying transmission of subsequent I/O operation requests, clients accessing the local storage resource within their reserved allocations may receive a congestion metric (e.g., a zero metric) that permits them to send I/O operation requests without delay. After the congestion has subsided, the VSAN module 114 may stop transmitting congestion metrics after each client request.

In an alternative embodiment, the host LSOM sub-module 350 calculates a local measure of congestion and sends the congestion metric to each client without tailoring the congestion metric to the resource usage of a particular client. Upon which clients delay requests if they are oversubscribing. It could then be up to the consuming client to respond to congestion if they're oversubscribing.

Figure 7:
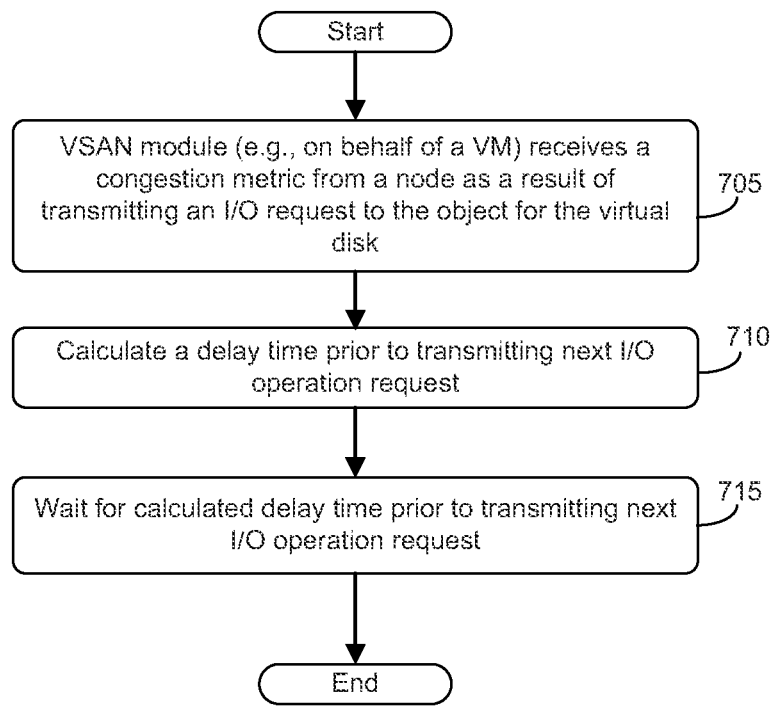
FIG. 7 illustrates a method for delaying an I/O operation request to the VSAN module during congestion.

FIG. 7 illustrates a method for delaying an I/O operation request to the VSAN module during congestion, according to one embodiment. In step 705, a client (e.g., a VSAN module 114 of a node 111 supporting a VM) running on a node of cluster 110 may receive a congestion metric as a result of transmitting an I/O operation request to its virtual disk, as described in FIG. 6. For example, the LSOM sub-module 350 of a client VSAN module 114 may, in communicating with the LSOM sub-module 350 of the VSAN module 114 of the node storing an object may receive such a congestion metric. The DOM sub-module 340 of client VSAN module 114 may calculate a time delay based on the congestion metric. Upon receiving the congestion metric, if the client VSAN module 114 (through its DOM sub-module 340) needs to transmit additional I/O operation requests, in step 710, it calculates a time to delay prior to transmitting the request, for example, based on a random distribution over a range, where the maximum value is a function of the congestion metric. In step 715, the client VSAN module 114 waits for calculated delay prior to transmitting the I/O operation request. The wait period calculated from the congestion metric may be based on the amount of IOPS the client is exceeding the reserved allocation. That is, clients exceeding the reserved allocation far more than clients exceeding by a smaller amount may be required to delay requests for a longer period.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. For example, although a number of foregoing described embodiments describe virtual machines as the clients that access the virtual disks provided by the VSAN module, it should be recognized that any clients, such as a cluster of non-virtualized host servers and/or non-virtualized applications running therein may similarly utilize the VSAN module in alternative embodiment. Similarly, alternative embodiments of the VSAN module may enable creation of high level storage objects other than virtual disks, such as, without limitation, REST objects, files, file systems, blob (binary large objects) and other objects. Similarly, while the congestion prevention techniques described in the foregoing embodiments related primarily to dealing with congestion at local storage resources, alternative embodiments may utilize similar techniques to reduce contention for memory, processing and/or networking resources that may arise, for example, if a single node operates as a coordinator for two different virtual disks currently being accessed by two different VMs. In such embodiments, DOM sub-module 340 may also monitor resource usage in CPU, memory, and networking to deal with contention for those resources in a manner similar to that of LSOM sub-module 350 in monitoring resource usage such as IOPS and capacity for the local storage resources (or alternatively, LSOM sub-module 350 may also be configured to monitor CPU, memory and/or networking usage). Similarly, while VSAN module 114 has been generally depicted as embedded in hypervisor 113, alternative embodiments may implement VSAN module separate from hypervisor 113, for example as a special virtual machine or virtual appliance, a separate application or any other "pluggable" module or driver that can be inserted into computing platform in order to provide and manage a distributed object store.

As described, embodiments described herein measure congestion and control quality of service to distributed resources. Advantageously, by issuing a congestion metric to clients while resources are contended and requiring all clients that are overusing resources to delay requests, these embodiments provide predictability in accessing distributed resources and delivers low latency to clients that use resources as provisioned. Further, delaying the requests at ingress to the resource application rather than at the resource queues requires less complicated queuing logic than previous solutions have required.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims.

We claim:

1. A computer-implemented method for providing resource usage feedback to a plurality of clients having access to a shared storage resource, the method comprising:
   monitoring a rate of usage of the shared storage resource by at least a portion of the clients, wherein a minimum usage rate for the shared storage resource is reserved for each client;
   upon detecting that the rate of usage of the shared storage resource as monitored has exceeded a maximum rate supported by the shared storage resource, determining a congestion metric for each of the clients that are currently attempting to access the shared storage resource, wherein the congestion metric for each client is based on usage by each client of the shared storage resource; and
   transmitting the corresponding determined congestion metric to each of the clients that are currently attempting to access the shared storage resource for each of the clients to introduce no delay or non-zero delay based on the corresponding determined congestion metric prior to attempting another access of the shared storage resource, wherein all clients that have exceeded their reserved minimum usage rate for the shared storage resource are transmitted a congestion metric having a non-zero value that results in a delay period being calculated by the client and all clients that have not exceeded their reserved minimum usage rate for the shared storage resource are transmitted a congestion metric having a zero value that results in no delay period being calculated by the client.

2. The method of claim 1,
   wherein the shared storage resource is a local storage drive housed in a host computer belonging to a cluster of host computers that supports the execution of the plurality of clients and
   wherein each host computer in the cluster contributes a corresponding local storage drive to form a pool of shared storage resources accessible as a single virtual storage device.

3. The method of claim 2,
   wherein at least one of the clients is performing I/O operations on a virtual disk, and
   wherein at least one section of the virtual disk is backed by a portion of the shared storage resource and at least one other section of the virtual disk is backed by a different local storage disk housed in a different host computer belonging to the cluster.

4. The method of claim 3, wherein the virtual disk is organized as a RAID 0 stripe set and the section of the virtual disk backed by a portion of the shared storage resource and the at least one other section of the virtual disk backed by a different local storage disk both represent a different stripe in the stripe set.

5. The method of claim 3,
   wherein a second client is performing I/O operations on a second virtual disk, and
   wherein at least one portion of the second virtual disk is backed by a second portion of the shared storage resource and at least one other portion of the second virtual disk is backed by a different local disk housed in a different host computer belonging to the cluster.

6. The method of claim 1, wherein the clients each comprise a virtual machine running in one of the host computers in the cluster.

7. A non-transitory computer readable storage medium storing instructions, which, when executed on a processor, performs an operation for providing resource usage feedback to a plurality of clients having access to a shared storage resource, the operation comprising:
   monitoring a rate of usage of the shared storage resource by at least a portion of the clients, wherein a minimum usage rate for the shared storage resource is reserved for each client;
   upon detecting that the rate of usage of the shared storage resource as monitored has exceeded a maximum rate supported by the shared storage resource, determining a congestion metric for at least a portion each of the clients that are currently attempting to access the shared storage resource, wherein the congestion metric for each client is based on usage by each client of the shared storage resource; and
   transmitting the corresponding determined congestion metric to each of the clients that are currently attempting to access the shared storage resource for each of the clients to introduce no delay or non-zero delay based on the corresponding determined congestion metric prior to attempting another access of the shared storage resource, wherein all clients that have exceeded their reserved minimum usage rate for the shared storage resource are transmitted a congestion metric having a non-zero value that results in a delay period being calculated by the client and all clients that have not exceeded their reserved minimum usage rate for the shared storage resource are transmitted a congestion metric having a zero value that results in no delay period being calculated by the client.

8. The non-transitory computer readable storage medium of claim 7,
   wherein the shared storage resource is a local storage drive housed in a host computer belonging to a cluster of host computers that supports the execution of the plurality of clients and
   wherein each host computer in the cluster contributes a corresponding local storage drive to form a pool of shared storage resources accessible as a single virtual storage device.

9. The non-transitory computer readable storage medium of claim 8,
wherein at least one of the clients is performing I/O operations on a virtual disk, and
wherein at least one section of the virtual disk is backed by a portion of the shared storage resource and at least one other section of the virtual disk is backed by a different local storage disk housed in a different host computer belonging to the cluster.

10. The non-transitory computer readable storage medium of claim 9, wherein the virtual disk is organized as a RAID 0 stripe set and the section of the virtual disk backed by a portion of the shared storage resource the at least one other section of the virtual disk backed by a different local storage disk both represent a different stripe in the stripe set.

11. The non-transitory computer readable storage medium of claim 9,
wherein a second client is performing I/O operations on a second virtual disk, and
wherein at least one portion of the second virtual disk is backed by a second portion of the shared storage resource and at least one other portion of the second virtual disk is backed by a different local disk housed in a different host computer belonging to the cluster.

12. The non-transitory computer readable storage medium of claim 7, wherein the clients each comprise a virtual machine running in one of the host computers in the cluster.

13. A computer system, comprising:
a processor and a memory hosting a module, which, when executed on the processor, performs an operation for providing resource usage feedback to a plurality of clients having access to a shared storage resource, the operation comprising:
monitoring a rate of usage of the shared storage resource by at least a portion of the clients, wherein a minimum usage rate for the shared storage resource is reserved for each client;
upon detecting that the rate of usage of the shared storage resource as monitored has exceeded a maximum rate supported by the shared storage resource, determining a congestion metric for each of the clients that are currently attempting to access the shared storage resource, wherein the congestion metric for each client is based on usage by each client of the shared storage resource; and
transmitting the corresponding determined congestion metric to each of the clients that are currently attempting to access the shared storage resource for each of the clients to introduce no delay or non-zero delay based on the corresponding determined congestion metric prior to attempting another access of the shared storage resource, wherein all clients that have exceeded their reserved minimum usage rate for the shared storage resource are transmitted a congestion metric having a non-zero value that results in a delay period being calculated by the client and all clients that have not exceeded their reserved minimum usage rate for the shared storage resource are transmitted a congestion metric having a zero value that results in no delay period being calculated by the client.

14. The computer system of claim 13,
wherein the shared storage resource is a local storage drive housed in a host computer belonging to a cluster of host computers that supports the execution of the plurality of clients and
wherein each host computer in the cluster contributes a corresponding local storage drive to form a pool of shared storage resources accessible as a single virtual storage device.

15. The computer system of claim 14,
wherein at least one of the clients is performing I/O operations on a virtual disk, and
wherein at least one section of the virtual disk is backed by a portion of the shared storage resource and at least one other section of the virtual disk is backed by a different local storage disk housed in a different host computer belonging to the cluster.

16. The computer system of claim 15, wherein the virtual disk is organized as a RAID 0 stripe set and the section of the virtual disk backed by a portion of the shared storage resource and the at least one other section of the virtual disk backed by a different local storage disk both represent a different stripe in the stripe set.

17. The computer system of claim 15,
wherein a second client is performing I/O operations on a second virtual disk, and
wherein at least one portion of the second virtual disk is backed by a second portion of the shared storage resource and at least one other portion of the second virtual disk is backed by a different local disk housed in a different host computer belonging to the cluster.

* * * * *